US010929449B2

(12) United States Patent
Fu et al.

(10) Patent No.: US 10,929,449 B2
(45) Date of Patent: *Feb. 23, 2021

(54) GENERATING A STRUCTURED DOCUMENT GUIDING VIEW

(71) Applicant: International Business Machines Corporation, Armonk, NY (US)

(72) Inventors: Guo Kang Fu, Beijing (CN); Xue Feng Gao, Beijing (CN); Bing Xin Wang, Beijing (CN); Yi Yao, Beijing (CN); Da Wei Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/391,172

(22) Filed: Apr. 22, 2019

(65) Prior Publication Data

US 2019/0243848 A1 Aug. 8, 2019

Related U.S. Application Data

(63) Continuation of application No. 13/546,566, filed on Jul. 11, 2012, now Pat. No. 10,318,646.

(30) Foreign Application Priority Data

Jul. 29, 2011 (CN) .......................... 201110226076.2

(51) Int. Cl.
G06F 17/00 (2019.01)
G06F 16/335 (2019.01)
G06F 16/93 (2019.01)

(52) U.S. Cl.
CPC ............ *G06F 16/335* (2019.01); *G06F 16/93* (2019.01)

(58) Field of Classification Search
CPC .. G06F 16/244; G06F 16/248; G06F 16/9024; G06F 16/24564; G06F 3/04842;
(Continued)

(56) References Cited

U.S. PATENT DOCUMENTS 5,694,594 A 12/1997 Chang
6,374,271 B1 4/2002 Shimizu et al.
(Continued)

FOREIGN PATENT DOCUMENTS

CN 101124574 A 2/2008
CN 101334775 A 12/2008

OTHER PUBLICATIONS

Author Unknown, NetLibrary Guide, Instruction Guide for National Oceanic and Atmospheric Administration Science Center/Library, Sep. 2007, pp. 1-2, NOAA, published at: http://www.lib.ncep.noaa.gov/itresources/netlibrary/netlibraryguide.pdf.
(Continued)

*Primary Examiner* — Andrew T McIntosh
(74) *Attorney, Agent, or Firm* — Haley J. McClory

(57) ABSTRACT

A user reading statistic data set relating to a natural language document is received. The user reading statistic data set includes information indicative of at least one of a set of user reading statistic types. A set of machine logic rules is applied to the user reading statistic data set to generate, as reading assistance to the reader with reading the natural language document, a user reading comprehension data set including information indicative of reading comprehension with respect to content of the natural language document.

9 Claims, 5 Drawing Sheets

(58) Field of Classification Search
CPC ............. G06F 3/04847; G06F 11/3452; G06F 11/3476; G06F 2201/86; G06F 17/18; G06F 11/3409; G06F 16/335; G06F 16/93; G06N 20/00; G06K 2009/00738; H04L 67/306; H04L 43/045

See application file for complete search history.

(56) References Cited

U.S. PATENT DOCUMENTS

| | | | |
|---|---|---|---|
| 7,496,830 | B2 | 2/2009 | Rubin et al. |
| 8,635,520 | B2 | 1/2014 | Christiansen et al. |
| 8,793,575 | B1 | 7/2014 | Lattyak et al. |
| 2003/0009459 | A1 | 1/2003 | Chastain et al. |
| 2003/0210226 | A1 | 11/2003 | Ho et al. |
| 2004/0139400 | A1 | 7/2004 | Allam et al. |
| 2004/0201633 | A1 | 10/2004 | Barsness et al. |
| 2005/0027671 | A1 | 2/2005 | Hind et al. |
| 2006/0155782 | A1 | 7/2006 | Berstis et al. |
| 2007/0083505 | A1 | 4/2007 | Ferrari et al. |
| 2007/0298399 | A1 | 12/2007 | Shao et al. |
| 2009/0259947 | A1 | 10/2009 | Bechtel et al. |
| 2011/0087955 | A1 | 4/2011 | Ho et al. |
| 2011/0157098 | A1 | 6/2011 | Liu |
| 2012/0005617 | A1 | 1/2012 | Lee et al. |
| 2012/0054672 | A1 | 3/2012 | McDowell |
| 2012/0078612 | A1 | 3/2012 | Kandekar et al. |
| 2012/0191545 | A1 | 7/2012 | Leibu et al. |
| 2012/0221583 | A1 | 8/2012 | Kulack et al. |
| 2012/0316841 | A1* | 12/2012 | Rameau ................. G06F 30/00 703/1 |
| 2012/0324423 | A1 | 12/2012 | Khan et al. |
| 2013/0024761 | A1 | 1/2013 | Bartomeli et al. |
| 2013/0031456 | A1 | 1/2013 | Fu et al. |

OTHER PUBLICATIONS

Jawwad, How to Stamp or Type your Own Text & Sticky Notes in PDF Documents?, Archived webpage/site, Feb. 18, 2008, pp. 1-5, Inspired Geek, published at: http://web.archive.org/web/20101017193813/http://www.inspiredgeek.com/2008/02/18/how-to-stamp-or-type-your-own-text-sticky-notes-in-pdf-documents/.

United States Patent and Trademark Office, Office Action for U.S. Appl. No. 13/546,566, dated Jan. 2, 2015, pp. 1-19, Alexandria, VA, USA.

United States Patent and Trademark Office, Office Action for U.S. Appl. No. 13/546,566, dated Jul. 31, 2015, pp. 1-21, Alexandria, VA, USA.

United States Patent and Trademark Office, Office Action for U.S. Appl. No. 13/546,566, dated Feb. 12, 2016, pp. 1-23, Alexandria, VA, USA.

United States Patent and Trademark Office, Office Action for U.S. Appl. No. 13/546,566, dated Sep. 8, 2016, pp. 1-20, Alexandria, VA, USA.

United States Patent and Trademark Office, Office Action for U.S. Appl. No. 13/546,566, dated Mar. 6, 2017, pp. 1-26, Alexandria, VA, USA.

United States Patent and Trademark Office, Office Action for U.S. Appl. No. 13/546,566, dated Aug. 11, 2017, pp. 1-40, Alexandria, VA, USA.

United States Patent and Trademark Office, Examiner Interview Summary for U.S. Appl. No. 13/546,566, dated Nov. 14, 2017, pp. 1-3, Alexandria, VA, USA.

United States Patent and Trademark Office, Office Action for U.S. Appl. No. 13/546,566, dated Dec. 14, 2017, pp. 1-47, Alexandria, VA, USA.

United States Patent and Trademark Office, Advisory Action for U.S. Appl. No. 13/546,566, dated Mar. 9, 2018, pp. 1-3, Alexandria, VA, USA.

United States Patent and Trademark Office, Office Action for U.S. Appl. No. 13/546,566, dated Jul. 27, 2018, pp. 1-65, Alexandria, VA, USA.

United States Patent and Trademark Office, Examiner Interview Summary for AU.S. Appl. No. 13/546,566, dated Oct. 30, 2018, pp. 1-5, Alexandria, VA, USA.

United States Patent and Trademark Office, Notice of Allowance for U.S. Appl. No. 13/546,566, dated Jan. 23, 2019, pp. 1-9, Alexandria, VA, USA.

* cited by examiner

GENERATING A STRUCTURED DOCUMENT GUIDING VIEW

BACKGROUND

The present invention relates to the field of document processing technology. More specifically, the present invention relates to a method and system of generating a structured document guiding view that may reflect the reading interests and habits of a user.

At present, e-Reading technology has gained an increasingly wider application. With respect to a traditional paper medium, e-Reading is popular among readers due to its characteristics such as portability, high speed, efficiency, and ease for search.

SUMMARY

A method includes: receiving, via a processor, an operation of a user on a document; analyzing the received operation; and generating a structured guiding view for the document by using a result of the analyzing and a basic structure of the document.

A system includes: a memory that stores a document and a processor programmed to: receive an operation of a user on the document; analyze the received operation; and generate a structured guiding view for the document by using a result of the analyzing and a basic structure of the document.

A computer program product includes a computer readable storage medium having computer readable program code embodied therewith, where the computer readable program code when executed on a computer causes the computer to: receive an operation of a user on a document; analyze the received operation; and generate a structured guiding view for the document by using a result of the analyzing and a basic structure of the document.

BRIEF DESCRIPTION OF THE DRAWINGS

The above and other features of the present invention will become more apparent through detailed description of the embodiments as illustrated with reference to the accompanying drawings. In the accompanying drawings of the present invention, like reference signs indicate like or similar components. In the drawings.

DETAILED DESCRIPTION

Figure 1:
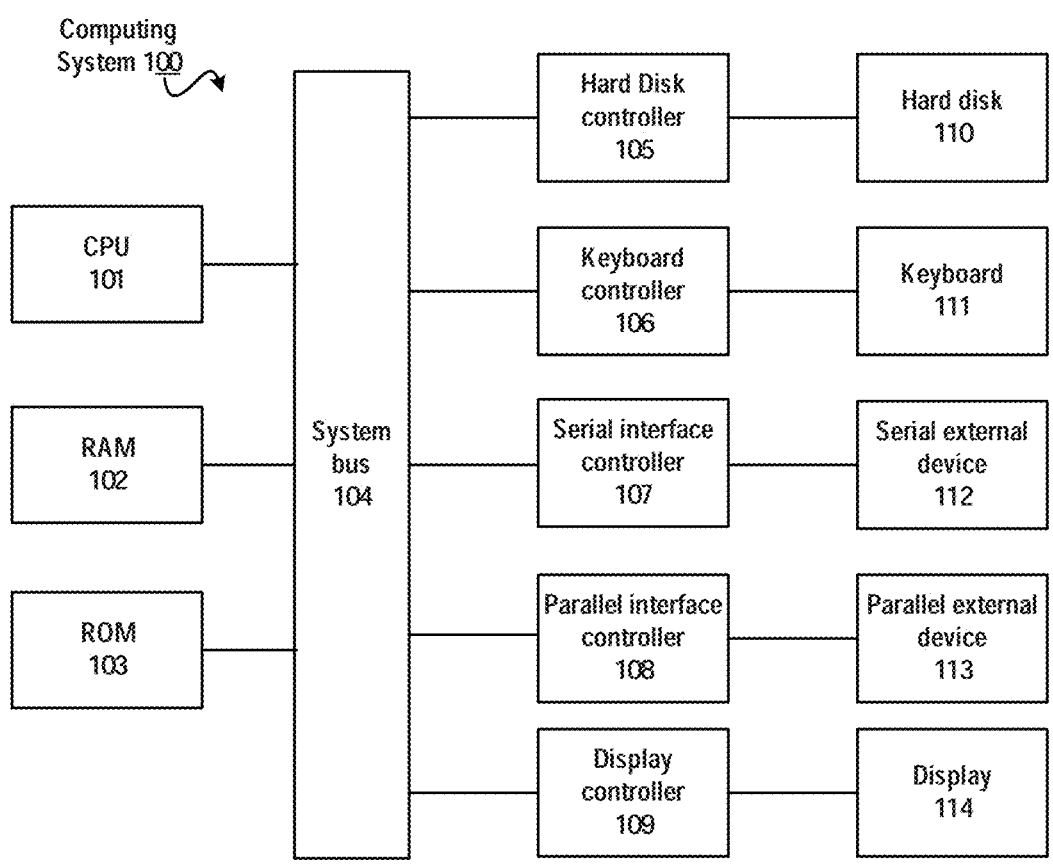
FIG. 1 is a block diagram of an example of an implementation of a computing system 100 according to an embodiment of the present subject matter.

Hereinafter, a method, system, and computer program product for generating a structured document guiding view according to the present subject matter will be described in detail through preferred embodiments with reference to the drawings.

The present subject matter relates to the field of document processing technology. More specifically, the present subject matter relates to a method and a system of generating a structured document guiding view that may reflect the reading interests and reading habits of a user. The present technology provides for generation of a structured guiding view for a document in response to receiving an operation of a user on the document. The received operation is analyzed and a structured guiding view for the document is generated by using a result of the analyzing and a basic structure of the document. As such, a user's reading interests and reading habits may be analyzed through the user's reading behaviors or through notations added to the document by the user, and the result of the analyzing may be mapped into an intuitively presentable structured guiding view for the document, such that a reader (the same reader or another reader) of the electronic document may intuitively obtain information about the user's reading interests and reading habits to assist the reader with reading the electronic document.

It should be noted that conception of the present subject matter resulted from recognition of certain limitations associated with inconveniences in e-Reading. For example, it was observed that for a long eBook (or any electronic document), if the user is unable to finish the reading all at once, the user may have to re-read some important chapters (annotated by the user) that have been previously read when continuing the reading from the interrupted portion so as to recall relevant content. It was further determined that previous eBooks themselves are unable to help the user determine which chapters are important, or quickly locate the required important chapter. Further, it was observed that, if the user frequently shifts between some chapters in previous reading (which potentially indicates that these chapters have mutual associations), previous eBooks are unable to help the users intuitively identify which chapters are associated or what kind of association there is between the chapters. It was additionally determined that in most cases, the user may only find the associations between chapters, importance of a chapter, or notations added by the user by re-browsing the content of the eBook. Further, it was observed that for another reader of the eBook or electronic document, he/she is unable to conveniently learn from the understanding on the eBook/document as embodied through a prior reading behavior or notation made by a prior reader. For example, it was observed that another reader is unable to determine which chapters were read for a long time or browsed repetitively, which chapters were frequently jumped to or shifted, which chapters were flagged with a high importance, etc. It was further observed that certain electronic documents include structured information, such as a catalogue or index. Further, it was observed that there is a proposed technical solution of generating a structured diagram using the existing structured information in these documents to present the document structure. However, it was determined that such a structured diagram only presents the structure of the electronic document itself, without information reflecting the user's reading interests and habits (for example, the association between chapters, importance, etc.) that is generated based on the user's reading behaviors or notations. The present technology improves eReading experiences by generating a structured document guiding view.

In view of the above described observations and determinations, the present technology provides a technical solution that may analyze reading interests and habits of a user through the user's reading behaviors with respect to an electronic document or an annotation added to the document by the user. Additionally, the present subject matter provides a technical solution that may map an analysis result into an intuitively presentable structured guiding view. Further, the present subject matter provides a technical solution of intuitively presenting a user's reading interests and reading habits with respect to an electronic document by using existing structured information for the electronic document. A still further technological improvement is that the present subject matter provides a technical solution that enables a user of a document to learn from and refer to the user's reading history, interests, and habits. The present subject matter also provides a technical solution that enables a user of a document to learn from and refer to another user's reading history, interests, and habits.

As such, the present technology allows a user's reading interests and habits to be analyzed through the user's reading behaviors or the added notations, and the result of analyzing may be mapped into an intuitively presentable structured document guiding view, such that a reader of the electronic document (which may be a reader that performs the reading behavior or a reader that reads the electronic document for the first time using the structured document guiding view) may intuitively obtain information about the user's reading interests and habits to assist the reader with reading the electronic document.

Now, reference is made to FIG. 1, where FIG. 1 is a block diagram of an example of an implementation of a computing system 100 according to an embodiment of the present subject matter. As illustrated in FIG. 1, the computer system 100 may include: a CPU (Central Processing Unit) 101, a RAM (Random Access Memory) 102, a ROM (Read Only Memory) 103, a system bus 104, a hard disk controller 105, a keyboard controller 106, a serial interface controller 107, a parallel interface controller 108, a monitor (display) controller 109, a hard disk 110, a keyboard 111, a serial peripheral (external) device 112, a parallel peripheral (external) device 113 and a monitor (display) 114. Among these components, connected to the system bus 104 are the CPU 101, the RAM 102, the ROM 103, the hard disk controller 105, the keyboard controller 106, the serial interface controller 107, the parallel interface controller 108, and the monitor controller 109. The hard disk 110 is coupled to the hard disk controller 105; the keyboard 111 is coupled to the keyboard controller 106; the serial peripheral device 112 is coupled to the serial interface controller 107; the parallel peripheral device 113 is coupled to the parallel interface controller 108; and the monitor 114 is coupled to the monitor controller 109. It should be understood that the structural block diagram in FIG. 1 is shown only for illustration purpose, and is not intended to limit the scope of the present subject matter. In some cases, some devices may be added or removed as required.

Figure 2:
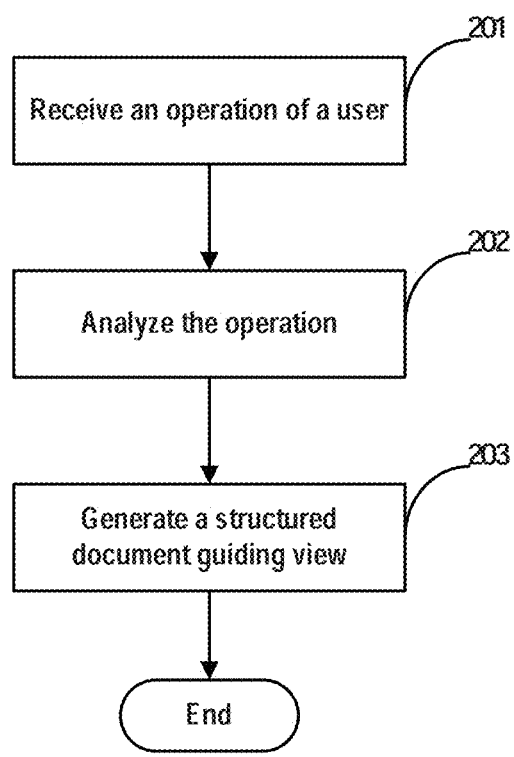
FIG. 2 is a flow chart of an example of an implementation of a method of generating a structured document guiding view according to an embodiment of the present subject matter.

FIG. 2 is a flow chart of an example of an implementation of a method of generating a structured document guiding view according to an embodiment of the present subject matter. The method of FIG. 2 starts at step 201. At step 201, an operation of user on a document is received. The term "document" in the present description refers to "electronic document," unless otherwise indicated. The "electronic document" in the present description includes all texts, tables, readable instructions, images, and even audio/video contents that are stored in an electronic medium in the form of data. According to one embodiment of the present subject matter, the "electronic document" includes structured information. The structured information of a document refers to the information about the basic structure of an electronic document, which information is stored in the form of data in the electronic document, for example, including hierarchical relationships among individual portions of the electronic document and brief information of each portion (for example, chapter code, caption, etc.). With the program Office Word (registered trademark of the Microsoft Corporation) word processing program as an example, for a Word document, its structure information may be displayed through an "outline view" option, which may display the hierarchical level to which each paragraph belongs and the dependency relationship among individual paragraphs. When editing the Word document, the hierarchical relationship among the paragraphs may also be set under the "outline view" option. Some Word documents further have catalogue and index information, which provides the structure information of the electronic documents in a more intuitive manner. It should be understood that different electronic document processing software may have different manners of storing or representing its structure information. For example, a segmented character (generally responsive to the "Enter" key input) and a sub-section delimiter may be used to record or represent the structure information of an electronic document. Even where there is no existing catalogue or index information, the structure information of an electronic document may also be extracted by analyzing the format and style of the document, for example, caption level, paragraph line feed, page, etc.

According to one embodiment of the present subject matter, the operation of a user on an electronic document may include the user's reading behavior with respect to the electronic document, for example, the time duration for the user staying on a certain portion (chapter or paragraph) of the electronic document during the reading process, the frequency of reading a certain portion, a jumping relationship among several portions of the electronic document, etc. This is based on the following consideration: the above mentioned reading behaviors may reflect the user's reading interests or habits while reading an electronic document. For example, if a user stays on a certain paragraph in the electronic document for a long time or stays on this paragraph for several times, this reading behavior may indicate that it may take the user a very long time to understand this portion of content or that it may require the reader to read this portion of content repetitively, which may further indicate that this portion of content is very important or difficult to understand. As another example, if a user frequently jumps between the second paragraph and the fourth paragraph of the electronic document, this reading behavior may indicate that these two paragraphs have a certain correlation and are often read in combination. It should be understood that a user's reading behavior with respect to an electronic document may include many other types of behavior, and are not limited to the above enumerated behaviors. For example, it is also a reading behavior that the user directly deletes a certain paragraph in the electronic document. This operation may reflect that the user believes this paragraph is meaningless, etc. As another example, the operations on some portions of content in the document by the user via a peripheral device, such as selecting the highlighted portion of content by a mouse or printing the content of a certain paragraph, also belongs to a user's reading behavior with respect to a document.

According to another embodiment of the present subject matter, the operation of a user on an electronic document may include the user inputting an annotation in an electronic document. The inputted annotation may be a literal note (for example, inputting "bravo" at the end of a paragraph) or a symbol identification (for example, inputting "?" at the end of a certain page to indicate that the user has doubts on the content of this page). The inputted annotation embodies the user's interest or specific emotion/thoughts during the process of reading this electronic document.

Because the operations of a user on the electronic document are performed through an electronic medium that stores or presents the electronic document, such operations may naturally be recorded by the electronic medium.

Next, the method as shown in FIG. 2 proceeds to step 202. At step 202, the received operation is analyzed. It may be seen from the description above that because the received operation of the user on an electronic document reflects the user's interests, habits, focuses, or some specific emotions/thoughts while reading, statistical analysis may be performed on the received operation so as to quantitatively and intuitively represent these reading interests and habits. In the following, reference will be made to FIG. 3 to specifically describe a method of analyzing operations according to various embodiments of the present subject matter. However, it should be noted that, regardless of the manner and rule employed for analysis, as long as the result of analyzing the operations attempts to reflect (qualitatively or quantitatively) a user's reading interests and habits, it falls within the protection scope of the present subject matter.

At step 203, a structured document guiding view is generated by using a result of analyzing the operations and a basic structure of the electronic document. The "structured document guiding view" means that: (1) this view is a structured diagram or a diagram represented in structure, for example, a tree diagram, a hierarchical relationship diagram, and a content index diagram, etc., which are all structured diagrams; (2) the view has a functionality of guiding, including not only the guiding with respect to simple hierarchical level information such as document content, paragraphs, paging, etc., but also structured guiding on information including a user's reading interests and habits. It should be understood that since the analysis on the operation of the user at step 202 is directed to the user's reading interests and habits performed with reference to the basic structure information of the electronic document, a structured document guiding view including the user's reading interests and habits information may be generated by using the result of analysis of the operations and the basic structure of the electronic document. Hereinafter, reference will be made to FIG. 3 and FIG. 4 to specifically describe embodiments of generating a structured document guiding view.

To summarize, with the method as illustrated in FIG. 2, the user's reading interests and habits may be analyzed based on operations of the user on the electronic document, and a result of the analysis may be mapped into an intuitively presentable structured document guiding view. Using the structured document guiding view, a reader of the electronic document (which may be the reader who performs the reading behavior or the reader who reads the electronic document for the first time) may intuitively obtain the information about the user's reading interests and habits, so as to facilitate the reader to read the electronic document.

Figure 3:
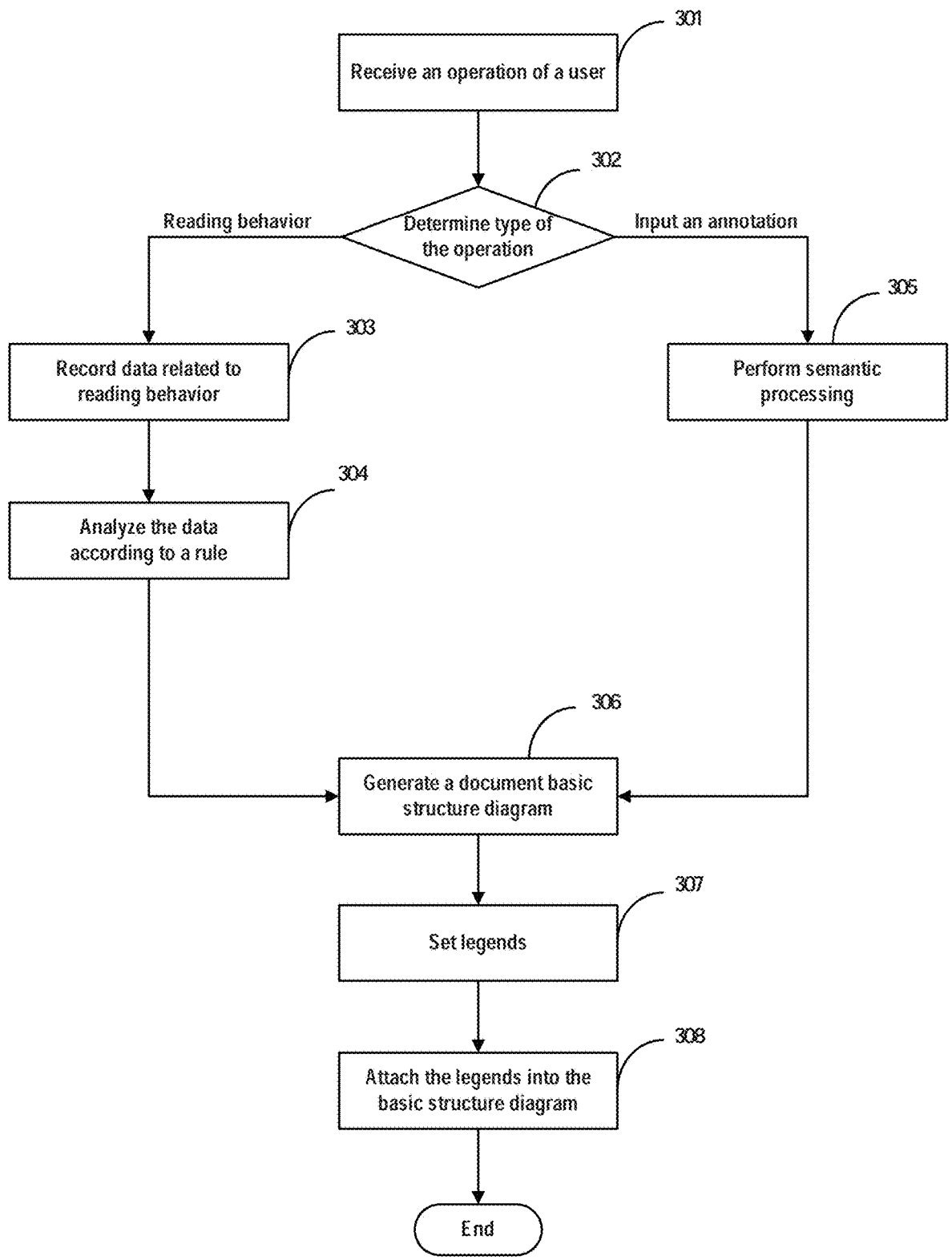
FIG. 3 is a flow chart of an example of an implementation of a method of generating a structured document guiding view according to another embodiment of the present subject matter.

FIG. 3 is a flow chart of an example of an implementation of a method of generating a structured document guiding view according to another embodiment of the present subject matter. The method of FIG. 3 starts at step 301. At step 301, an operation of a user on an electronic document is received. Because step 301 corresponds to step 201, it will not be detailed here.

Next, the method proceeds to step 302, where the type of the received user operation is determined. If the received operation relates to the user's reading behavior with respect to the electronic document (the explanation of "reading behavior" has been described above), then the method proceeds to step 303 to record data related to the reading behavior. In view of the above explanation on "reading behavior," the data related to the reading behavior may include, for example, the time duration for the user staying on a certain portion of the electronic document, the times of reading a certain portion of the electronic document by the user during a time unit, jumping sequences among several portions of the electronic document, etc. Next, at step 304, the recorded data are analyzed according to a predetermined rule. The rule defines and corresponds to the user's reading behavior and the user's reading interests or habits with respect to the electronic document. For example, a predetermined rule may be "if time>60 s, then mark the paragraph as 'important.'" This means "if the user stays on a certain paragraph of the electronic document for more than 60 seconds, then this paragraph represents an important paragraph." The predetermined rule may also be "if direct jump>5, then mark the two paragraphs as 'related.'" This means "if the times of direct jump are greater than 5, then the two paragraphs are related." Some further predetermined rules may utilize comparison. For example, the rule "the paragraph with the maximum times of reading is the paragraph of most interest to the user" allows making statistics on the reading times of different paragraphs and obtaining the result of analysis. It should be noted that the examples described above are only three examples of predetermined rules. Different rules may be predetermined as appropriate to analyze the data on the user's reading behavior.

Next, referring back to step 302, if it is determined at step 302 that the received user operation is inputting an annotation in the electronic document, then the method proceeds to step 305. At step 305, semantic processing is performed on the inputted annotation to reflect the user's reading interests or habits with respect to the document. For example, if a user inputs a question mark "?" at an end of a paragraph of the electronic document, then such an operation indicates that the user has doubts about the paragraph. The "semantic processing" as used herein means performing semantic processing on the annotation "?" as inputted by the user, so as to obtain the meaning of this annotation (e.g., the user has doubts on this paragraph). As another example, if the user selects the literal content of a certain paragraph in a document and then adds a special color background to distinguish it from other words, then through semantic processing on the words being highlighted with the special color background, the analysis may result in a determination that the content in this paragraph is important. According to one embodiment of the present subject matter, semantic processing on the annotation inputted by the user may be performed based on a predetermined rule. The predetermined rule here may be, for example "?—doubtful content" (which indicates that if the user inputs "?", it indicates that the content in this paragraph is doubtful), "if background color=blue, then the highlighted text is important" (if some literal content has a blue background, it indicates that this portion is an important portion). It should be noted that the above examples provide two examples of predetermined rules for the user inputting annotations, and that many other different predetermined rules may be implemented as appropriate to perform semantic processing on the annotations inputted by the user.

The method of FIG. 3 proceeds to step 306 where a basic structure diagram of the electronic document is generated. It has been described above with reference to FIG. 2 how to extract structure information of an electronic document. At step 306, the extracted structure information of the electronic document is represented in a form of a diagram (e.g., a structured basic structure diagram). The specific form of the basic structure diagram depends on the structure organization manners of the electronic document. For example, it may be a tree diagram, an index content diagram, a hierarchical relationship diagram, etc. Regardless of the pattern and effect of the diagram, as long as the diagram reflects the structure information of the electronic document itself, it belongs to the "basic structure diagram" in step 306. According to an embodiment of the present subject matter, the "basic structure diagram" may be a "basic structure diagram" for a portion of content of the document, rather than the overall "basic structure diagram" of the whole document.

At step 307, legends representing different meanings are set. The purpose of setting legends is to represent the result of analyzing in step 304 or 305 in a manner of graphical marks. For example, a rectangular mark may be used to represent "the paragraph of the most interest to the user," an oval mark for "the paragraph read by the user most recently," a rectangular mark for "the paragraph most frequently referenced," a unidirectional arrow for "unidirectional reference," a bidirectional arrow for "bidirectional reference," and a "?" for "requires follow up," etc. It should be noted that different legends may be set as appropriate, and the already set legends may also be modified at any time.

Next, at step 308, by using the results of analyzing at steps 304 and 305, the legends set at step 307 are attached into the basic structure diagram of the electronic document, generating a structured document guiding view. For example, if the paragraph most recently read by the user is the second paragraph of the electronic document, it means that the oval legend indicating "the paragraph read by the user most recently" may be added to the corresponding location representing the second paragraph in the basic structure diagram of the electronic document. As another example, if it is derived by analysis at step 304 that the user is most interested in the second chapter according to the rule "the paragraph read the most times is the paragraph of the most interest to the user," it will indicate that the rectangular legend representing "the paragraph of the most interest to the user" may be added to the corresponding location representing the second chapter in the basic structure diagram of the electronic document.

According to one embodiment of the present subject matter, besides directly attaching a legend into the basic structure diagram of the electronic document, in order to provide an improved user experience, a property of a corresponding legend may be added in the structured document guiding view. For example, for the legend "unidirectional arrow" that represents a unidirectional reference relationship, a property "key word" may be added on the corresponding unidirectional arrow in the structured document guiding view, such that the user may understand more intuitively on which key word the unidirectional reference relationship is established. According to one embodiment of the present subject matter, when the "basic structure diagram" is a "basic structure diagram" for a portion of content of the document, the generated structured document guiding view is also a guiding view related to the portion of content of the document. For example, a structured document guiding view may be generated step by step for the document portions that have been read by the user based on the reading progress of the user. Of course, an overall "basic structure diagram" for the whole document may also be directly generated regardless of the content of the document that has been read by the user, and then a corresponding legend attached onto the overall basic structure diagram, thereby generating a structured document guiding view.

It should be noted that steps 306 and 307 in the method of FIG. 3 may be carried out after the analyzing steps 304 and 305 as illustrated in the figure, may be carried out before the step 301 of receiving the operation of user, or may be carried out at any time as long as a document basic structure diagram is generated and legends are set before the final generation of the structured document guiding view (step 308). Whether to carry out steps 306 and 307 does not affect the implementation of steps 301-305. Further, there is no sequence requirement when implementing steps 306 and 307. The legends may be set before generating the basic structure diagram of the electronic document, or the basic structure diagram of the electronic document may be generated before setting the legends.

It should be further noted that the two branches after determining at step 302 (one branch is step 303 and step 304, the other branch is step 305) are not necessary. Those skilled in the art may adopt the step(s) of one branch thereof to analyze after understanding the content of the present subject matter, for example, only analyzing the user-inputted annotations or only analyzing the reading behavior data of the user, which may likewise generate a structured document guiding view without departing from the technical concept of the present subject matter. It also falls within the protection scope of the present subject matter. Thus, when only analyzing the user-inputted annotations or only analyzing the reading behavior data of the user, the determining step 302 may also be omitted.

Figure 4:
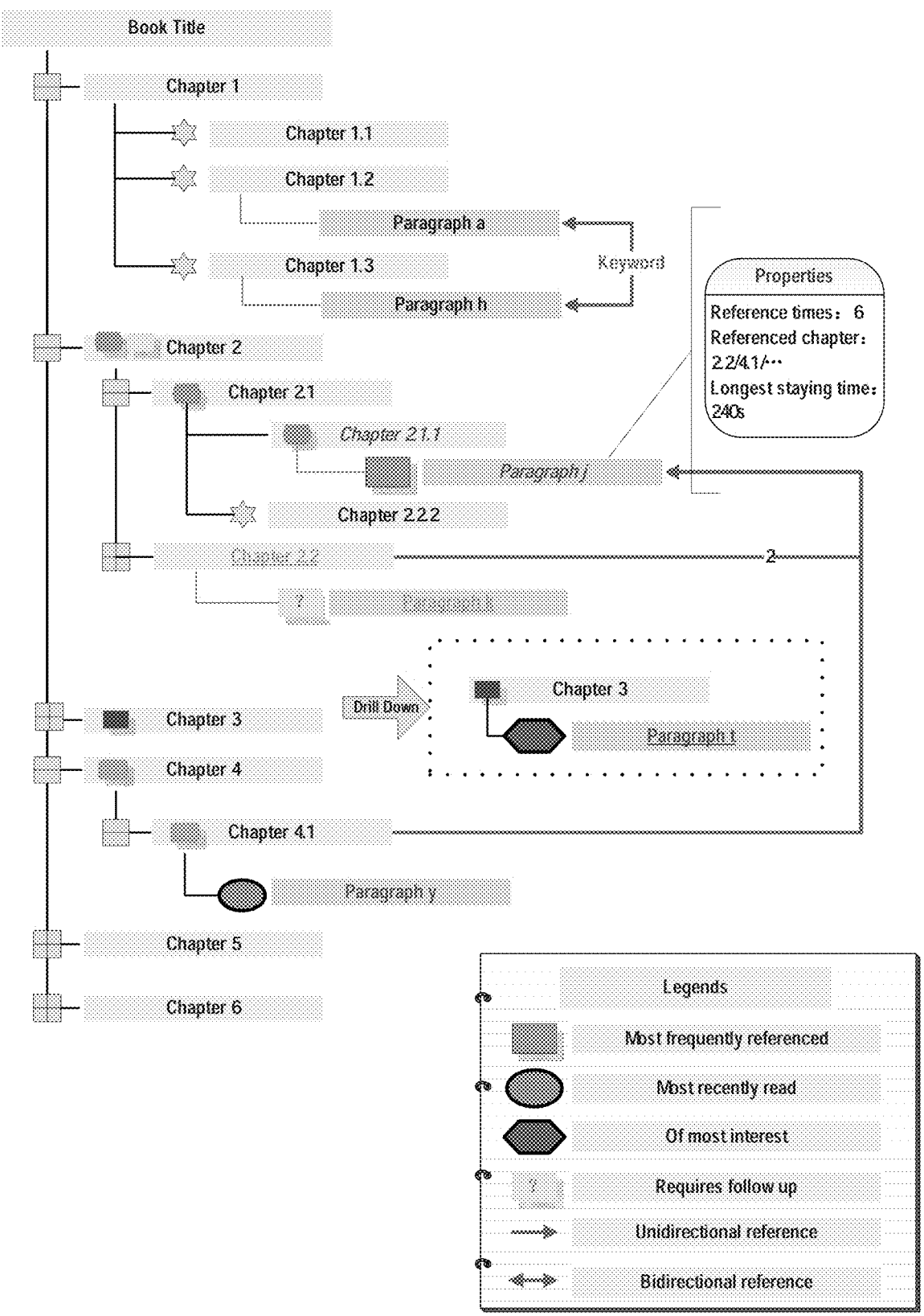
FIG. 4 is an illustration of an example of an implementation of a generated structured document guiding view according to an embodiment of the present subject matter.

FIG. 4 is an illustration of an example of an implementation of a generated structured document guiding view according to an embodiment of the present subject matter. The right lower corner of FIG. 4 illustrates the specific meanings of legends. It should be noted that the final generated and presented structured document guiding view does not necessarily present therein the specific meanings of the legends, and the user may look up the definitions of the legends otherwise. The structured document guiding view as illustrated in FIG. 4 includes six (6) legends, which are a rectangle, oval, hexagon, question mark, unidirectional arrow, and bidirectional arrow. Besides the six legends, the remaining graphic portion (e.g., the basic structure diagram from the electronic document) presents the structure information such as caption, chapter, paragraphs under the chapters, etc. Hereinafter, specific description will be made with respect to the question mark, hexagon, and bidirectional arrow as examples.

For the legend question mark (?), if the user has made a mark with a question mark at some place while reading, when generating a guiding view, the structured document guiding view may include a question mark by the paragraph with the question marked by the user as the tag property. In FIG. 4, the user may input a user annotation "?" at paragraph "k" (e.g., the kth paragraph) under section 2.2 and may further input a specific question. The location of paragraph "k" in FIG. 4 will then display the question mark "?" as seen in FIG. 4. According to one embodiment of the present subject matter, the specific question as inputted by the user may be directly displayed along with the question mark "?" in the structured document guiding view. According to another embodiment of the present subject matter, in response to the user clicking on the "?" in the structured document guiding view of FIG. 4, the specific question as previously inputted by the user will be further displayed.

For the legend hexagon, if it is derived through analysis that the user is most interested in a certain paragraph, then when generating the structured document guiding view, a hexagon tag representing most interest to the user may be attached by the paragraph. Further, other additional information as derived from analysis, such as the line or keyword of the most interest to the user and the access frequency may be taken as tag properties. It may be seen from FIG. 4 that in this electronic document, the user is most interested in paragraph "t" (e.g., the tth paragraph) in chapter 3 and that a hexagon legend has been added to the structured document guiding view. FIG. 4 does not directly display this paragraph of most interest. A more specific structured guiding view under chapter 3 may be finally displayed in response to the user clicking on the icon of chapter 3. Of course, display of all structured guiding view information simultaneously may be performed.

For the legend bidirectional arrow, if it is derived through analysis that the user believes there is a logic reference relationship between paragraph "a" and paragraph "h," and the key word "X" is regarded as an important link point, then when generating a structured document guiding view, an arrow note pointing from paragraph "h" may be added, and the key word "X" may be notated on the arrow line. The properties included in the arrow may include reference times, key words, etc.

The above describes a basic flow chart of generating a structured document guiding view based on user understanding and interest. The structured document guiding view may be drawn using an existing widget technology. According to one embodiment of the present subject matter, the structured document guiding view is editable. In other words, after the structured document guiding view is generated, the user may perform corresponding addition, deletion, modification to any node and primitive on the automatically generated structured document guiding view. The structured document guiding view of the document or eBook may also be exported into portable document format (PDF) or extensible markup language (XML) formats to be shared with other readers. The structured document guiding view being editable may also be embodied as further improving and modifying the existing structured document guiding view based on the operations on the document by other users of this document, such that the generated structured document guiding view may reflect a group of users' reading histories, interests, and habits with respect to the document.

Figure 5:
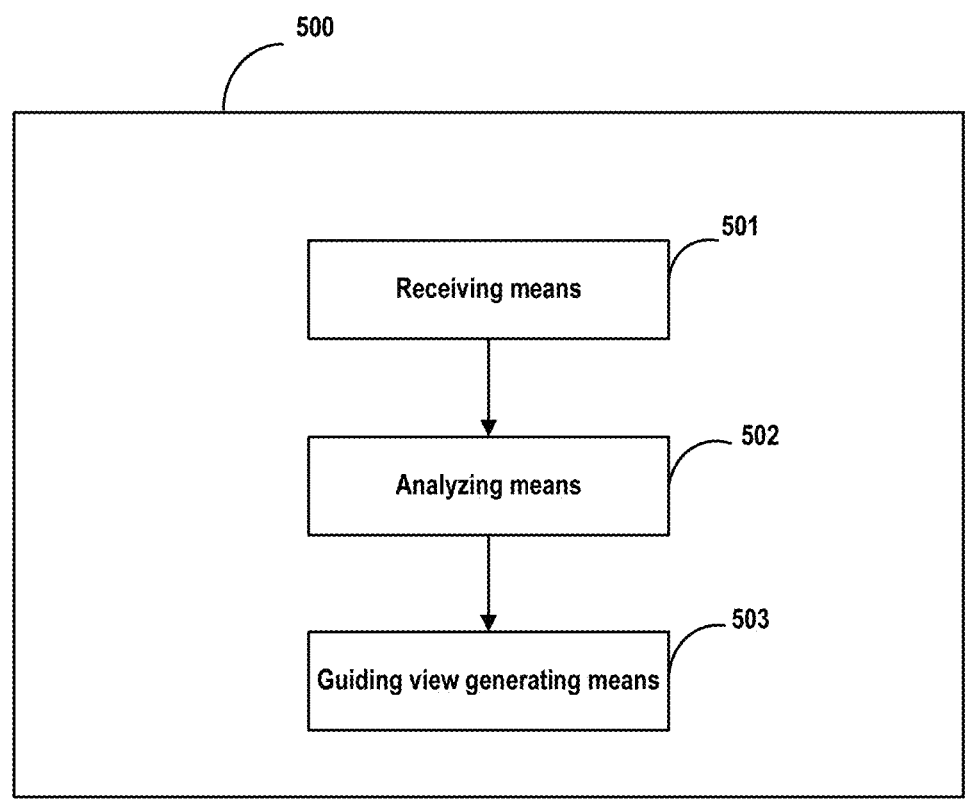
FIG. 5 is a block diagram of an example of an implementation of a system 500 of generating a structured document guiding view according to an embodiment of the present subject matter.

FIG. 5 is a block diagram of an example of an implementation of a system 500 of generating a structured document guiding view according to an embodiment of the present subject matter. The system as shown in FIG. 5 is generally indicated by the system 500. Specifically, the system 500 includes receiving means 501 configured to receive an operation of a user on the document; analyzing means 502 configured to analyze the received operation; and guiding view generating means 503 configured to generate a structured document guiding view for the document by using the result of analyzing and a basic structure of the document. It should be noted that the means 501-503 in the system 500 correspond to steps 201-203 in the method as shown in FIG. 2, which will not be detailed here.

The flowcharts and block in the figures illustrate the system, methods, as well as architecture, functions and operations executable by a computer program product according to the embodiments of the present subject matter. In this regard, each block in the flowcharts or block may represent a module, a program segment, or a part of code, which contains one or more executable instructions for performing specified logic functions. It should be noted that in some alternative implementations, functions indicated in blocks may occur in an order differing from the order as shown in the figures. For example, two blocks shown consecutively may be performed in parallel substantially or in an inverse order. This depends on relevant functions. It should also be noted that each block in the block diagrams and/or flowcharts and a combination of blocks in the block diagrams and/or flowcharts may be implemented by a dedicated hardware-based system for performing specified functions or operations or by a combination of dedicated hardware and computer instructions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for creating and displaying an editable structured document guiding view of an electronic document, comprising:

loading, by a processor, the electronic document comprising structured information stored as data within the electronic document describing hierarchical relationships among portions of the electronic document and information about each portion of the electronic document;

receiving, by the processor, a plurality of operations inputted by a user into the electronic document, the plurality of operations including behaviors by the user while reading the electronic document and annotations added to the electronic document by the user;

recording, by the processor, the plurality of operations inputted by the user, to an electronic medium that stores the electronic document;

analyzing, by the processor, the plurality of operations recorded to the electronic medium that stores the electronic document and the structured information describing the electronic document, wherein said analysis comprises using statistical analysis to quantitatively represent the plurality of operations inputted by the user into the electronic document;

generating, by the processor, as a result of analyzing the plurality of operations inputted by the user and the structured information describing the electronic document, the editable structured document guiding view comprising a structured diagram depicting hierarchical relationships among portions of the electronic document, and mapping representations of the user's reading habits, interests and the annotations inputted by the user into the electronic document within the structured diagram; and attaching, by the processor, a legend describing meanings of the representations of the user's reading habits, interests and annotations of the editable structured document guiding view as graphical marks within the structured diagram of the editable structured document guiding view.

2. The method of claim 1, further comprising:

editing, by the processor, the editable structured document guiding view of the electronic document, wherein the user inputs an addition, deletion or modification to any node of the editable structured document guiding view.

3. The method of claim 1, where the behaviors by the user while reading the electronic document and the annotations are selected from the group consisting of notes taken by the user while reading the electronic document, time spent by the user for each predetermined page portion of the electronic document, a page portion view sequencing by the user of predetermined page portions of the electronic document, searching activities performed by the user with respect to the electronic document, portion skip activities performed by the user with respect to the predetermined page portions of the electronic language document, and commenting activities performed by the user relating to the electronic document.

4. A system for creating and displaying an editable structured document guiding view of an electronic document, comprising:

a communication interface; and at least one processor set programmed to:

load the electronic document comprising structured information stored as data within the electronic document describing hierarchical relationships among portions of the electronic document and information about each portion of the electronic document;

receive, via the communication interface, a plurality of operations inputted by a user into the electronic document, the plurality of operations including behaviors by the user while reading the electronic document and annotations added to the electronic document by the user;

record the plurality of operations inputted by the user, to an electronic medium that stores the electronic document;

analyzing, by the processor, the plurality of operations recorded to the electronic medium that stores the electronic document and the structured information describing the electronic document, wherein said analysis comprises using statistical analysis to quantitatively represent the plurality of operations inputted by the user into the electronic document;

generate, as a result of analyzing the plurality of operations inputted by the user and the structured information describing the electronic document, the editable structured document guiding view comprising a structured diagram depicting hierarchical relationships among portions of the electronic document, and mapping representations of the user's reading habits, interests and the annotations inputted by the user into the electronic document within the structured diagram; and attach, by the processor, a legend describing meanings of the representations of the user's reading habits, interests and annotations of the editable structured document guiding view as graphical marks within the structured diagram of the editable structured document guiding view.

5. The system of claim 4, where the at least one processor set is further programmed to:

edit the editable structured document guiding view of the electronic document, in response to additional user inputs comprising an addition, deletion or modification to any node of the editable structured document guiding view.

6. The system of claim 4, where the behaviors by the user while reading the electronic document and the annotations are selected from the group consisting of notes taken by the user while reading the electronic document, time spent by the user for each predetermined page portion of the electronic document, page portion view sequencing by the user of the predetermined page portions of the electronic document, searching activities performed by the user with respect to the electronic document, portion skip activities performed by the user with respect to the predetermined page portions of the electronic document, and commenting activities performed by the user relating to the electronic document.

7. A computer program product for creating and displaying an editable structured document guiding view of an electronic document, comprising:

a non-transitory computer readable storage medium having computer readable program code embodied therewith, where the computer readable program code when executed on a computer causes the computer to:

load the electronic document comprising structured information stored as data within the electronic document describing hierarchical relationships among portions of the electronic document and information about each portion of the electronic document;

receive a plurality of operations inputted by a user into the electronic document, the plurality of operations including behaviors by the user while reading the electronic document and annotations added to the electronic document by the user;

record the plurality of operations inputted by the user, to an electronic medium that stores the electronic document;

analyzing, by the processor, the plurality of operations recorded to the electronic medium that stores the electronic document and the structured information describing the electronic document, wherein said analysis comprises using statistical analysis to quantitatively represent the plurality of operations inputted by the user into the electronic document;

generate, as a result of analyzing the plurality of operations inputted by the user and the structured information describing the electronic document, the editable structured document guiding view comprising a structured diagram depicting hierarchical relationships among portions of the electronic document, and mapping representations of the user's reading habits, interests and the annotations inputted by the user into the electronic document within the structured diagram; and attach a legend describing meanings of the representations of the user's reading habits, interests and annotations of the editable structured document guiding view as graphical marks within the structured diagram of the editable structured document guiding view.

8. The computer program product of claim 7, where the computer readable program code when executed on the computer further causes the computer to:

edit the editable structured document guiding view of the electronic document, in response to additional user inputs comprising an addition, deletion or modification to any node of the editable structured document guiding view.

9. The computer program product of claim 7, where the behaviors by the user while reading the electronic document and the annotations are selected from the group consisting of notes taken by the user while reading the electronic document, time spent by the user for each predetermined page portion of the electronic document, page portion view sequencing by the user of the predetermined page portions of the electronic document, searching activities performed by the user with respect to the electronic document, portion skip activities performed by the user with respect to the predetermined page portions of the electronic document, and commenting activities performed by the user relating to the electronic document.

\* \* \* \* \*